United States Patent

Humbert, Jr.

[11] 4,045,349
[45] Aug. 30, 1977

[54] FILTER WITH MULTIPLE ATTACHING MEANS

[75] Inventor: Kingsley E. Humbert, Jr., Gastonia, N.C.

[73] Assignee: Wix Corporation, Gastonia, N.C.

[21] Appl. No.: 703,913

[22] Filed: July 9, 1976

[51] Int. Cl.² .................................. B01D 27/08
[52] U.S. Cl. .................... 210/232; 210/DIG. 17; 210/443; 285/177
[58] Field of Search ............ 210/DIG. 17, 168, 184, 210/186, 232, 239, 240, 130, 443, 444; 285/177, 12; 138/40; 85/32.1, 33

[56] References Cited

U.S. PATENT DOCUMENTS

| | | | |
|---|---|---|---|
| 1,722,783 | 7/1929 | Basseches | 85/33 |
| 1,766,621 | 6/1930 | Fleming | 210/239 |
| 2,591,248 | 4/1952 | Francois | 210/168 |
| 2,748,949 | 6/1956 | James | 210/168 X |
| 3,352,341 | 11/1967 | Schertz | 85/33 |
| 3,529,722 | 9/1970 | Humbert, Jr. | 210/130 |
| 3,929,643 | 12/1975 | Donaldson et al. | 210/168 |

Primary Examiner—Theodore A. Granger
Attorney, Agent, or Firm—Shoemaker and Mattare, Ltd.

[57] ABSTRACT

A filter for use with different size attaching structures includes multiple attachment members individually and independently cooperable with different ones of the different size attaching structures, whereby a single filter configuration may be manufactured and stocked for desired use with any one of the different size attaching structures.

9 Claims, 7 Drawing Figures

FILTER WITH MULTIPLE ATTACHING MEANS

BACKGROUND OF THE INVENTION

This invention represents an improvement over the structure disclosed in my prior Patent No. 3,529,722, and relates generally to spin-on, throw-away type filter cartridges.

More particularly, filters of the type with which the present invention is concerned are intended for use as oil filters on internal combustion engines, as, for example, on automotive engines.

However, the different automotive manufacturers, and including both foreign and domestic manufacturers, provide different size or configured filter attaching structures on many of the different makes of vehicles, thus requiring manufacture and storage of the corresponding number of filters having different filter attaching structures thereon for cooperation with the attaching structures on the engines.

In a typical construction of the type utilizing an attaching structure for attachment of the spin-on type filter, a threaded stud is mounted in the block of the engine and has an externally threaded projecting portion for cooperation with complemental female threads in an attaching means on the filter to removably attach the filter to the engine. Most of the studs used on automotive engines in the United States come in one of two sizes, either 182–16 inches or 13/16–16 inches. Accordingly, filters must be manufactured having corresponding thread sizes of ⅜-16 inches and 13/16–16 in order to be operatively attached to the different size studs. Additionally, very popular thread sizes imported into the United States are 18 × 1.5mm and 20 × 1.5mm. Filters utilizing these thread sizes are usually of different overall diameter and length than those using the ⅜-16 inches and 13/16–16 inches threads. Thus, though a ⅜-16 inches internal thread will give marginally satisfactory engagement with a short length of 18 × 1.5mm external thread, and a 13/16–16 inches internal thread will likewise engage a short length of 20 × 1.5mm external thread, interchangeability of existing filters on the different thread sizes is not contemplated or easily accomplished. This, of course, requires manufacture and storage of a number of filters for each of the different size attaching structures and selection of the proper filter by the ultimate purchaser.

When the present invention, these four thread sizes could be serviced with a single filter configuration. At present, however, two filters would be the preferred solution to fit the majority of all passenger cars now produced, i.e., one filter to fit both 13/16–16 inches and ⅜-16 inches threads, and the other to fit both 20 × 1.5mm and 18 × 1.5mm threads.

In accordance with the present invention, unique multiple attaching means is thus provided on the filter, whereby a single filter configuration may be manufactured with the multiple attaching means thereon for attachment of the filter to either of the commonly used sizes of filter attaching means on automotive engines.

OBJECTS OF THE INVENTION

Thus, it is an object of the invention to provide a filter mounting means whereby the filter may be mounted to any one of a plurality of different filter mounting structures on internal combustion engines.

A more specific object of the invention is to provide a filter with multiple attaching means thereon comprising a pair of threaded openings, each of different diameter for cooperation with a respective different diameter threaded stud carried on an internal combustion engine, whereby the filter may be readily threadably attached to the stud simply by engagement with the proper size threaded nut carried by the filter.

DETAILED DESCRIPTION OF THE INVENTION

Figure 1:
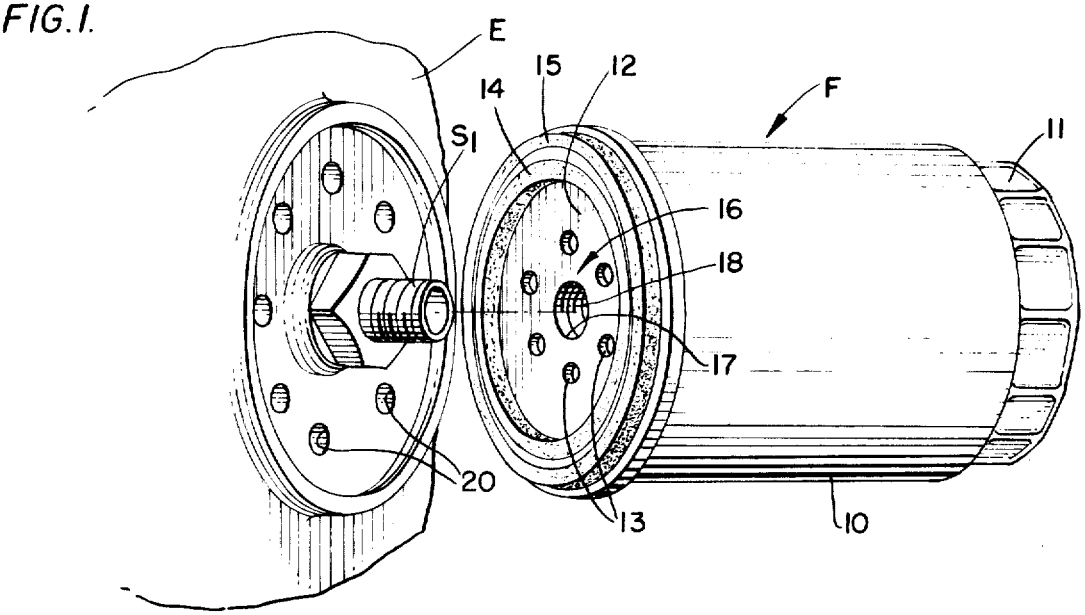
FIG. 1 is an exploded, perspective view showing a filter separated from the mounting structure on an internal combustion block.

In the drawings, wherein like reference numerals indicate like parts throughout the several views, a filter F in accordance with the invention comprises a cylindrical side wall 10 having a shaped closed end 11 thereon for cooperation with a filter wrench or the like and an opposite end wall 12 having apertures 13 therethrough for flow of oil into the filter. A pair of annular seal rings 14 and 15 are carried by the filter F on the end wall 12 for cooperation with sealing surfaces on all engines with which the filter F can be used. Centrally of the end wall 12 is located the attaching means 16 according to the invention, and which comprises multiple female members, including an outer member or a first threaded opening 17 of a predetermined size, as, for example, 20 millimeters, in the end wall 12 and an inner member or a second threaded opening 18 formed in a nut 19 carried by the filter.

In use, the filter F is threaded onto a cooperating male attaching means or structure such as stud S1 carried by the engine block E, whereby oil flows from the engine block E through openings 20 and thence through openings 13 and past the combined antidrain back and bypass valve 21, through the filter media 22 and thence back through the filter attaching means 16 and through the hollow interior 23 of the stud and back to the engine block.

Figure 2:
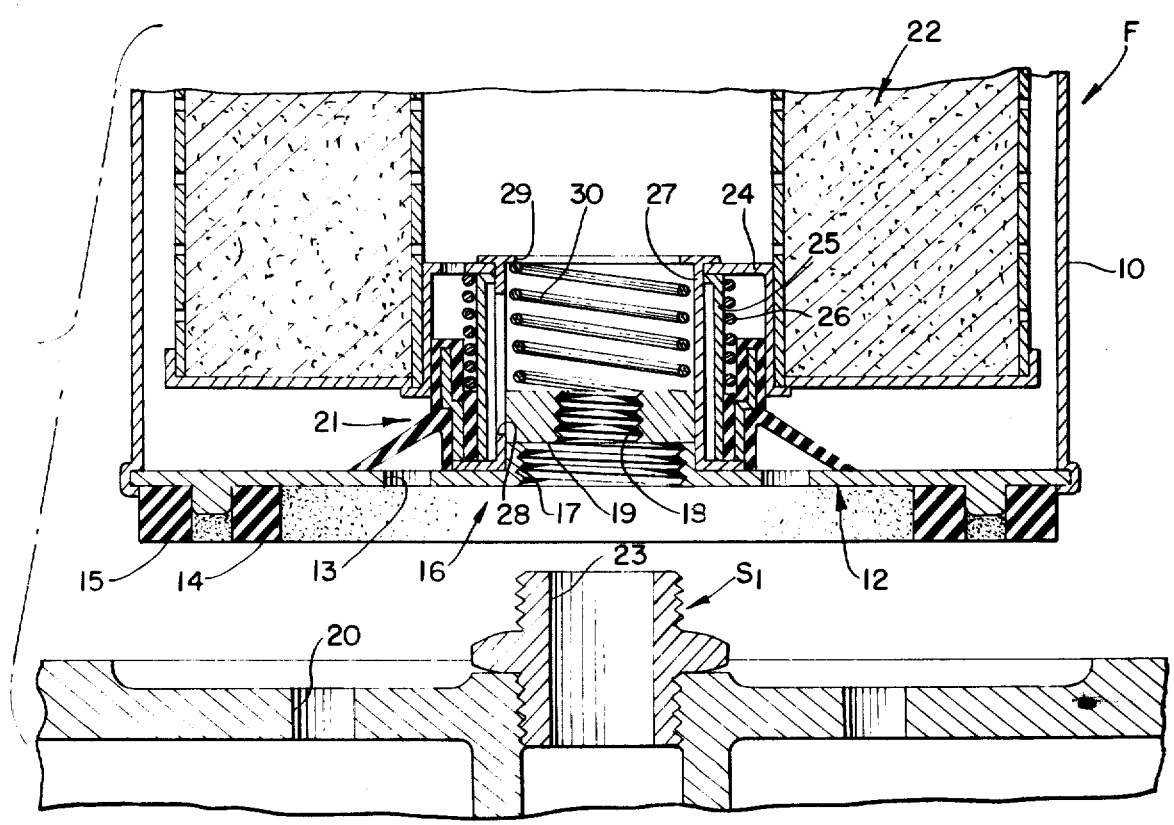
FIG. 2 is a greatly enlarged, fragmentary view in section of a filter incorporating the unique multiple attaching means according to the invention, and with the filter removed from the filter attaching means on the engine.
Figure 6:
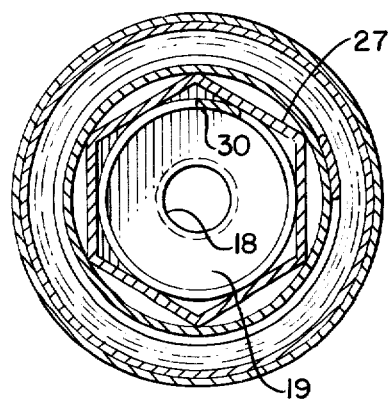
FIG. 6 is a view in section taken along line 6-6 of FIG. 5.

The attaching means 16 and antidrain back and bypass valve 21 comprise a substantially inverted, cup-shaped member 24 fitted within the central opening defined by filter media 22 and having an internal cylindrical sleeve 25 supported therewithin in radially inwardly spaced relation relative thereto, with the valve member 21 biased toward closed position by means of a coil spring 26 engaged in the space between cup-shaped member 24 and sleeve 25. A nut retaining sleeve 27 is supported and disposed inwardly of the sleeve 25 and has a cross-sectional configuration corresponding to that of the nut 19, whereby the nut will move axially within the retaining sleeve 27, but will not rotate relative thereto. In this connection, see FIG. 6. The nut retaining sleeve 27 is slotted or otherwise suitably formed with flow passage means at 28 to permit oil to flow through the sleeve or return directly to the engine when the filter media is bypassed upon opening of valve 21. Further, the upper end of the retaining sleeve 27 has a radially inwardly directed flange 29 thereon against which one end of a coil spring 30 is engaged. The spring 30 is engaged at its other end against the nut 19 maintaining it in the position shown in FIG. 2.

Thus, the filter F is usable either with a stud S1 having a relatively large diameter or with a stud S2 having a smaller diameter. For example, in FIG. 3 the filter F is shown engaged with a stud S1, whereby the stud S1 is threadably engaged in the threads 17 formed in the bottom cover 12 of the filter F. In this use of the invention, the end of the stud S1 engages the nut 19 and moves it against the bias of spring 30 such that the nut 19 does not interfere with proper operation or engagement of the stud S1 with threads 17.

Figure 4:
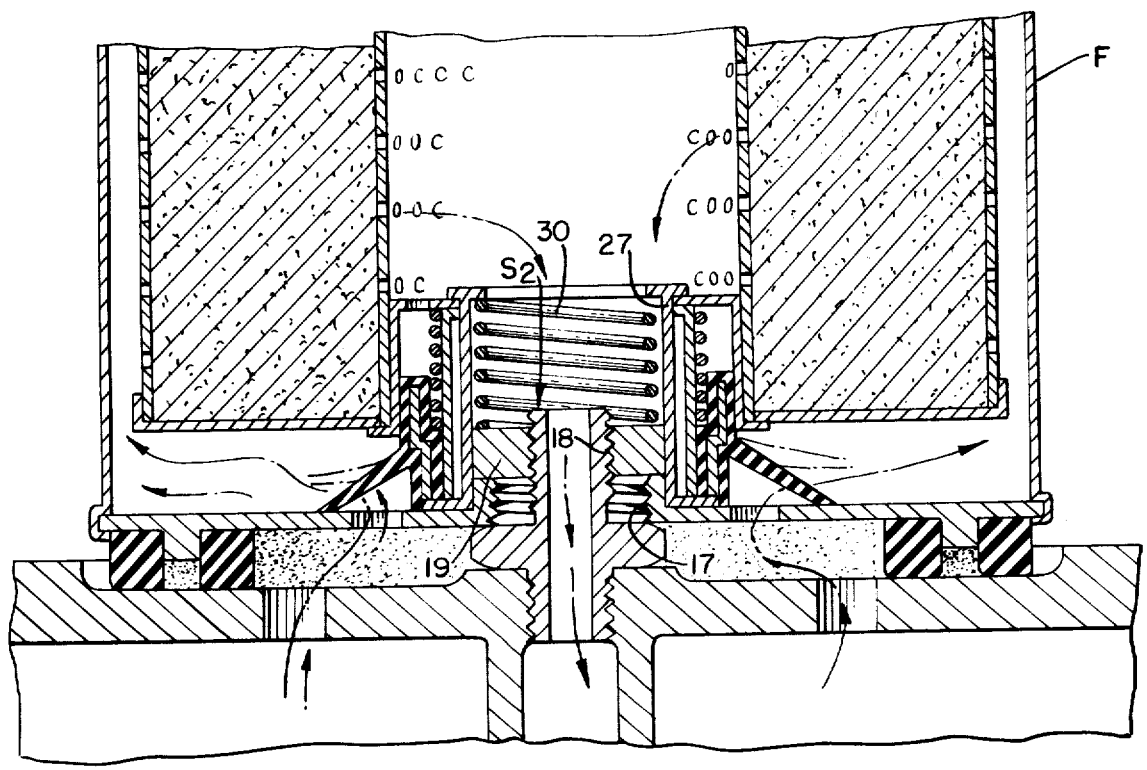
FIG. 4 is a view similar to FIG. 3, with the filter according to the invention shown attached to a different size filter attaching stud carried by the engine.
Figure 5:
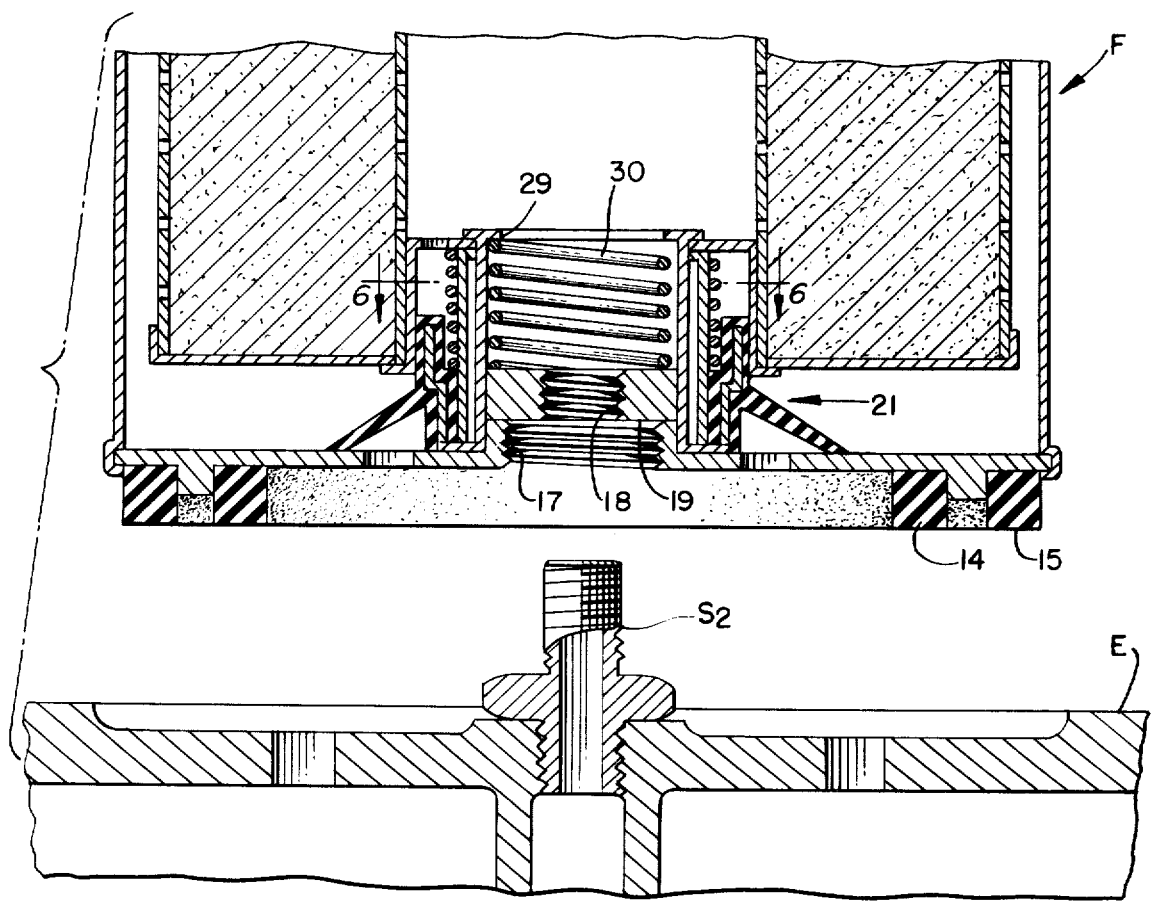
FIG. 5 is a view similar to FIG. 4, showing the filter removed from the filter attaching means carried by the engine.

Alternatively, as shown in FIG. 4, the filter F is shown used with a stud S2 having a smaller diameter, and in this use of the invention, the stud S2 passes upwardly through the threads 17 in spaced relation thereto and engages the threads 18 in nut 19, which is held against rotation by the complemental cross-sectional configuration of the retaining sleeve 27, and which is held in engagement against the end of the stud S2 as the threaded connection is being made by means of the spring 30.

Figure 3:
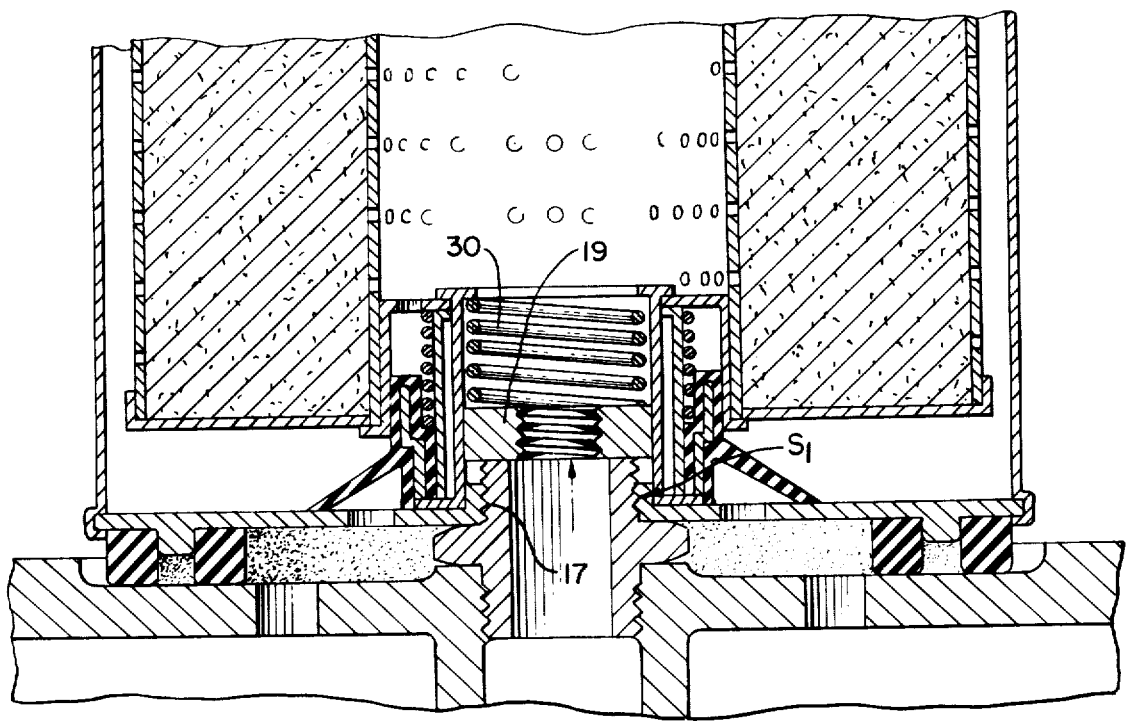
FIG. 3 is a view similar to FIG. 2 showing the filter attached to a first size attaching stud carried by the engine, and wherein one of the attaching nuts carried by the filter is rendered inoperative.
Figure 7:
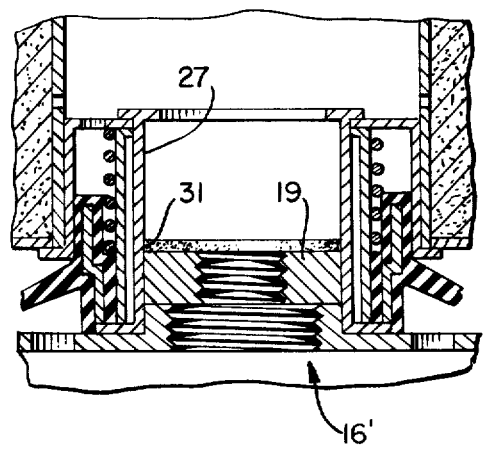
FIG. 7 is a fragmentary view in section of a modified means for retaining one of the two filter attaching nuts in position in the filter.

A modified attaching means 16' is illustrated in FIG. 7, and in this form of the invention, the structure is identical to that previously described, except that rather than the spring 30, an adhesive or other material 31 is used to temporarily retain the nut 19 in a position at the lower end of sleeve 27, whereby if a large stud S1 is engaged with the filter, the nut 19 will be displaced from the position shown in FIG. 7 to a position similar to that shown in FIG. 3, whereas if a smaller stud S2 is engaged with the filter, the nut 19 will be held in position for threaded engagement therewith.

While a particular antidrain back and bypass valve construction 21 has been illustrated and described in relation to the invention disclosed herein, it is to be understood that this valve does not comprise a part of the present invention, and other types of valve construction could be provided, or, in fact, one or both of the valves could be eliminated. Additionally, a pair of spaced seal rings 14 and 15 have been described in connection with the invention disclosed herein for sealing engagement with the engine block, but other types of suitable seals could be provided in association with the filter.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:
1. A spin-on filter comprising: a housing having opposite ends, one of said ends having fluid inlet and outlet openings therein; cooperating male and female attaching means on said one end of the filter and on an apparatus with which the filter is to be used, for securing the filter to the apparatus to obtain fluid communication between the apparatus and the interior of the housing, said attaching means on the filter comprising multiple, axially arranged members of different diameters for cooperation with respective corresponding attaching means of different diameters on the apparatus, said members positioned axially adjacent one another and including an inner member and an outer member, the outer member having a larger diameter than the inner member; and means releasably holding one of said members adjacent the other of said members, whereby when the filter is positioned to be secured to an attaching means on the apparatus having a large diameter, the corresponding large diameter member on the filter is operatively engaged with and secured to the attaching means on the apparatus, and and other member is inoperative, and when the filter is positioned to be secured to an attaching means on the apparatus having a small diameter, the corresponding small diameter member on the filter is operatively engaged with and secured to the attaching means on the apparatus, and the other member is inoperative, said releasably held member being movable to a non-interfering position when the other of said members is operatively engaged with an attaching means on the apparatus, thus enabling the filter to be selectively used with attaching means of different diameter.

2. A filter as in claim 1, wherein the filter comprises a throw-away oil filter for use on internal combustion engines to filter engine oil, and the multiple members on the filter comprise a plurality of different size threaded members for cooperation with corresponding different size threaded means on different engines.

3. A filter as in claim 2, wherein the different threaded members are coaxial with one another.

4. A filter as in claim 3, wherein the outer member comprises a first threaded opening in an end wall of the filter, and the inner member comprises a detachable member adjacent the end wall and having a second threaded opening therethrough in coaxial alignment with the first opening, said first opening being larger in diameter than the second opening, whereby an externally threaded member having a size corresponding to the first opening will threadably engage in the first opening and can engage and displace said detachable member to render it inoperative and non-interfering with the externally threaded member, and an externally threaded member having a size corresponding to the second threaded opening will extend through the first opening and into threaded engagement with the second opening.

5. A filter as in claim 4, wherein the detachable member comprises a threaded nut detachably secured in a shaped nut retaining sleeve in the filter, whereby the nut is held against rotation relative to the filter but is detachable for axial movement relative to the sleeve.

6. A filter as in claim 5, wherein the nut securing means comprises a spring engaged between the sleeve and nut, urging the nut toward and into engagement with the filter end wall.

7. A filter as in claim 5, wherein the nut securing means comprises an adhesive.

8. A filter as in claim 1, wherein the multiple members on the filter a pair of different size threaded openings in the filter for cooperation with different size externally threaded members on different engines on which the filter is used.

9. A filter as in claim 8, wherein one of the openings is in an end wall of the filter and the other opening is in a displaceable nut carried by the filter in coaxial relation to said one opening, said nut being secured against rotation relative to the filter and secured against relative axial movement therebetween until a predetermined axial force is imposed thereon.

* * * * *